(12) United States Patent
Sanpei (10) Patent No.: US 6,353,513 B1
(45) Date of Patent: Mar. 5, 2002

(54) TAPE CARTRIDGE

(75) Inventor: Takaaki Sanpei, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/422,658

(22) Filed: Oct. 22, 1999

(30) Foreign Application Priority Data

Oct. 30, 1998 (JP) .......................................... P10-309689

(51) Int. Cl.[7] .......................................... G11B 23/087
(52) U.S. Cl. ......................................................... 360/132
(58) Field of Search ....................... 360/132; 242/338.2, 242/338.3

(56) References Cited

U.S. PATENT DOCUMENTS

| | | | | |
|---|---|---|---|---|
| 4,742,418 A | * | 5/1988 | Tanaka et al. | 360/132 |
| 4,884,159 A | * | 11/1989 | Satoh | 360/132 |
| 5,140,488 A | | 8/1992 | Sugiyama et al. | 360/132 |
| 5,255,144 A | * | 10/1993 | Iwahashi et al. | 360/132 |
| RE34,927 E | * | 5/1995 | Meguro et al. | 360/132 |

* cited by examiner

Primary Examiner—Robert S. Tupper
(74) Attorney, Agent, or Firm—Jay H. Maioli (57) ABSTRACT

A tape cartridge includes reels having seats at the lower ends; a shell having a lower half formed with reel receivers with which the reel seats are loosely engaged, respectively, and an opening for loading a tape; a lid rotatably mounted to the shell for closing the opening of the shell; and a reel lock member for ensuring locking of the reels in connection with a closing operation of the lid. The tape cartridge further includes movement restricting means for restricting further movement of the reel lock member when it is urged to move to the reel lock position.

4 Claims, 9 Drawing Sheets

TAPE CARTRIDGE

BACKGROUND OF THE INVENTION

The present invention relates to a cartridge for tapes such as a digital data storage (DDS) tape and a digital audio tape (DAT), and more particularly, to a tape cartridge including reels locked by a reel lock member when the tape cartridge is not in use.

Figure 9:
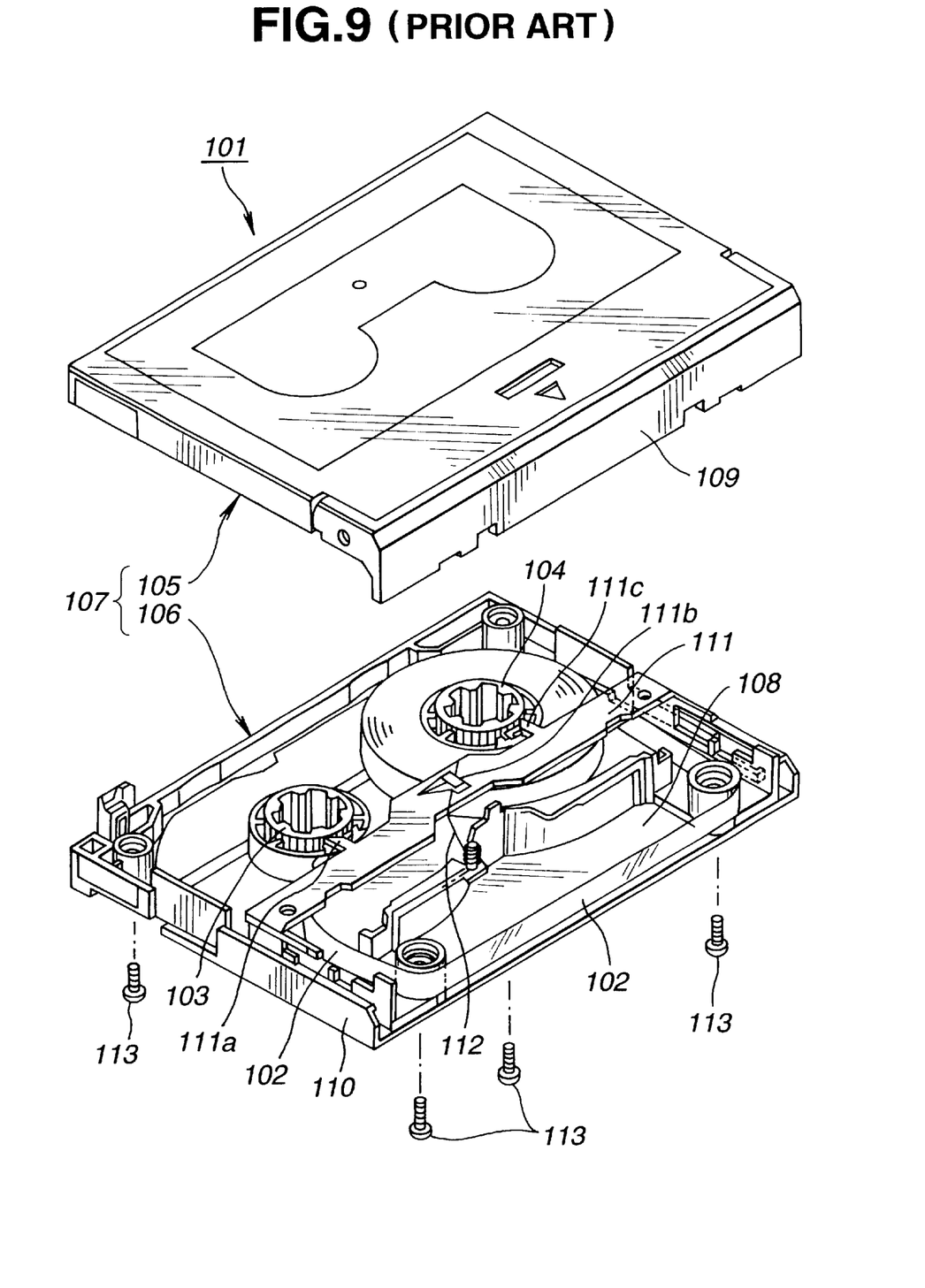
FIG. 9 is a view similar to FIG. 1, showing a known tape cartridge.

Referring to FIG. 9, a known tape cartridge 101 comprises a pair of reels or hubs 103, 104 having a magnetic tape or information recording medium 102 wound thereon, a shell 107 for rotatably housing the reels 103, 104 and including upper and lower halves 105, 106, a lid or rotary flap 109 rotatably mounted to the shell 107 on the front end and for covering the tape 102 running in a loading opening or a pocket 108 arranged in a front portion of the shell 107, a slide shutter 110 slidably mounted to a lower side of the shell 107 and for closing a lower portion of the pocket 108, a reel lock member 111 for ensuring lock of the reels 103, 104 and releasing lock thereof in connection with closing and opening operations of the lid 109, and a spring member or a reel lock spring 112 for biasing the reel lock member 111 in the reel lock direction.

Figure 10:
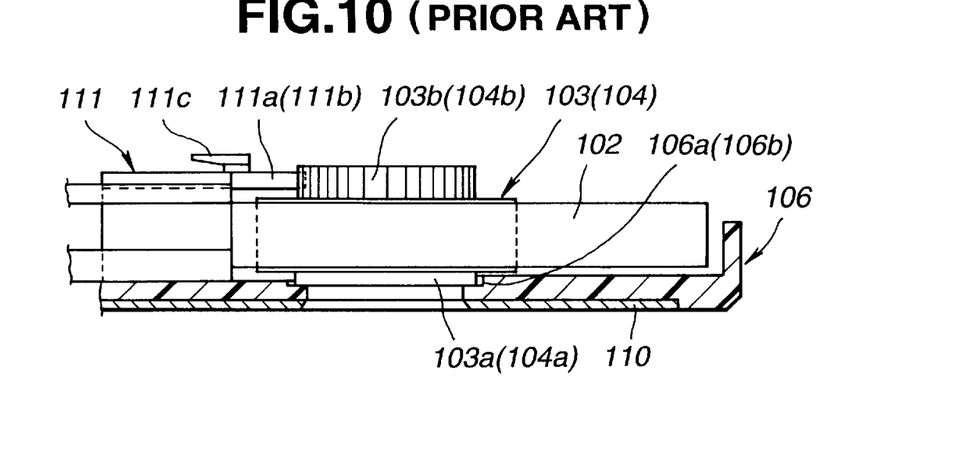
FIG. 10 is a view similar to FIG. 8, showing a reel locked by a reel lock member.

Referring to FIG. 10, each reel 103, 104 has a reel seat 103a, 104a at the lower end, which is loosely engaged with a reel receiver or a reel-seat hole 106a, 106b of the lower half 106 for rotation therein. The reel lock member 111 has a pair of reel engagements or claws 111a, 111b, which is engaged with counter-engagements or claw engagements 103a, 104b of the reels 103, 104 to prevent rotation thereof.

When assembling the tape cartridge 101, first, the reels 103, 104, the reel lock member 111, the reel lock spring 112, etc. are mounted to the lower half 106. Then, the upper half 105 is connected to the lower half 106 by fixtures such as screws 113 to form the shell 107. Finally, the lid 109 and the slide shutter 110 are mounted to the shell 107.

However, the known tape cartridge 101 has the following inconveniences:

1) Referring to FIGS. 9–10, when having mounted the reels 103, 104, the reel lock member 111, and the reel lock spring 112 to the lower half 106, the reel lock member 111 is urged to slide by force of the reel lock spring 112 so as to engage the reel engagements 111a, 111b with the counter-engagements 103b, 104b of the reels 103, 104, preventing rotation thereof. However, referring to FIG. 11, if the reel lock member 111 is urged to slide further by force of the reel lock spring 112 so as to push the reels 103, 104, the reel seats 103a, 104a are pressed on the inner peripheral surfaces of the reel receivers 106a, 106b of the lower half 106.

Figure 11:
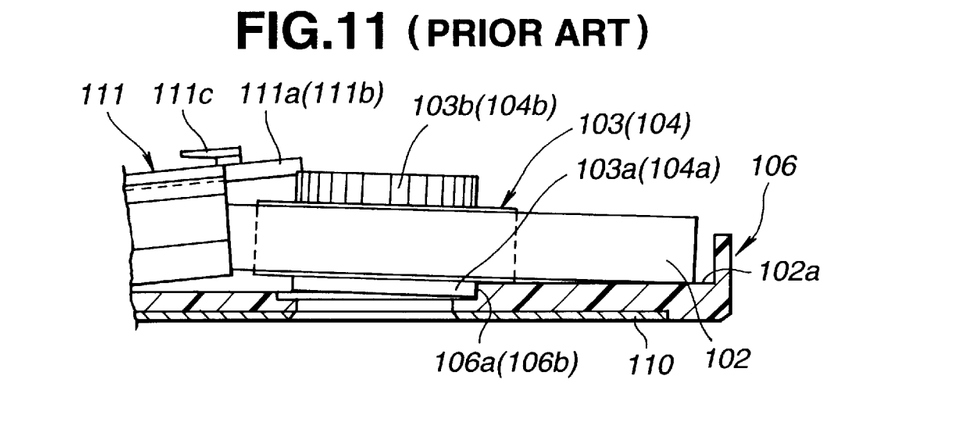
FIG. 11 is a view similar to FIG. 10, explaining one problem of the known tape cartridge.

This causes the reel lock member 111 and the reels 103, 104 to form an L-shaped protrusion.

Figure 12:
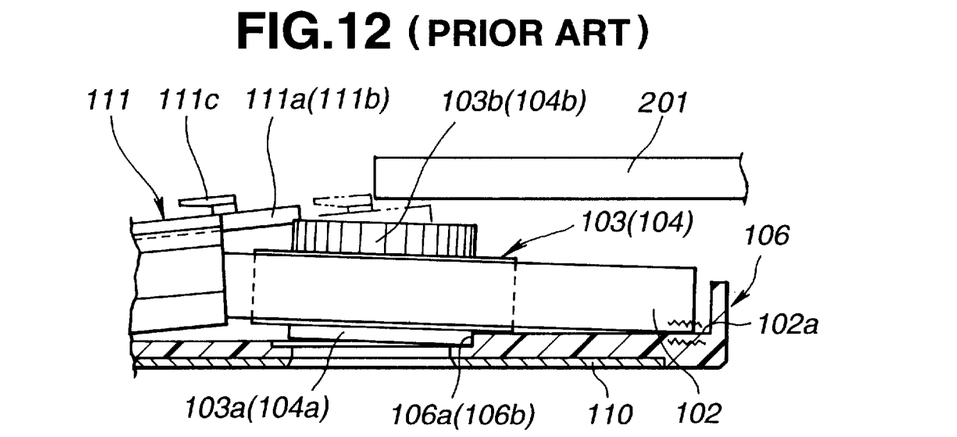
FIG. 12 is a view similar to FIG. 11, explaining another problem of the known tape cartridge.

Referring to FIG. 12, in assembling of the shell 107, a height checker block 201 serves to detect whether or not the reels 103, 104 and the reel lock member 111 are normally set on the lower half 106. If the reel lock member 111 and the reels 103, 104 swell out like an L-shape as described above, the assemblage may be detected as defective due to the fact that a reel-lock-spring engagement 111c, arranged on the reel lock member 111 contacts the height checker block 201.

2) While the reel lock member 111 and the reels 103, 104 form an L-shaped protrusion, a lower edge 102a of an outer peripheral portion of the magnetic tape 102 wound on the reels 103, 104 is pressed on the inner bottom or the inner side of the lower half 106, which may be damaged to produce a disadvantage for recording and reproducing of the tape 102.

3) If the reel lock member 111 pushes the reels 103, 104 excessively strongly, there may occur deformation or damage of the reel engagements 111a, 111b of the reel lock member 111 or the counter-engagements 103b, 104b of the reels 103, 104.

4) The above inconveniences can be removed by a reduction in the biasing pressure of the reel lock spring 112 by changing, e.g. the diameter thereof. However, this method reduces a reel lock effect when the tape cartridge 101 is not in use.

It is, therefore, an object of the present invention to provide a tape cartridge that is free of the above inconveniences, and enables sure reel lock without any damage of the device components.

SUMMARY OF THE INVENTION

One aspect of the present invention lies in providing a cartridge, comprising:

reels having a tape wound thereon, said reels including seats at lower ends thereof;

a shell rotatably housing said reels, said shell including upper and lower halves, said lower half being formed with receivers with which said seats of said reels are loosely engaged, respectively, and an opening for loading said tape;

lid rotatably mounted to said shell, said lid closing said opening of said shell;

a lock member ensuring lock of said reels in connection with closing operation of said lid;

a spring biasing said lock member in a reel lock direction; and means for restricting movement of said lock member when said lock member is urged to move to a reel lock position.

Another aspect of the present invention lies in providing a cartridge, comprising:

reels having a tape wound thereon, said reels including seats at lower ends thereof;

a shell rotatably housing said reels, said shell including upper and lower halves, said lower half being formed with receivers with which said seats of said reels are loosely engaged, respectively, and an opening for loading said tape;

a lid rotatably mounted to said shell, said lid closing said opening of said shell;

a lock member ensuring lock of said reels in connection with closing operation of said lid;

a spring biasing said lock member in a reel lock direction; and a device arranged with said lower half, said device restricting movement of said lock member when said lock member is urged to move to a reel lock position.

DETAILED DESCRIPTION OF THE INVENTION

Figure 1:
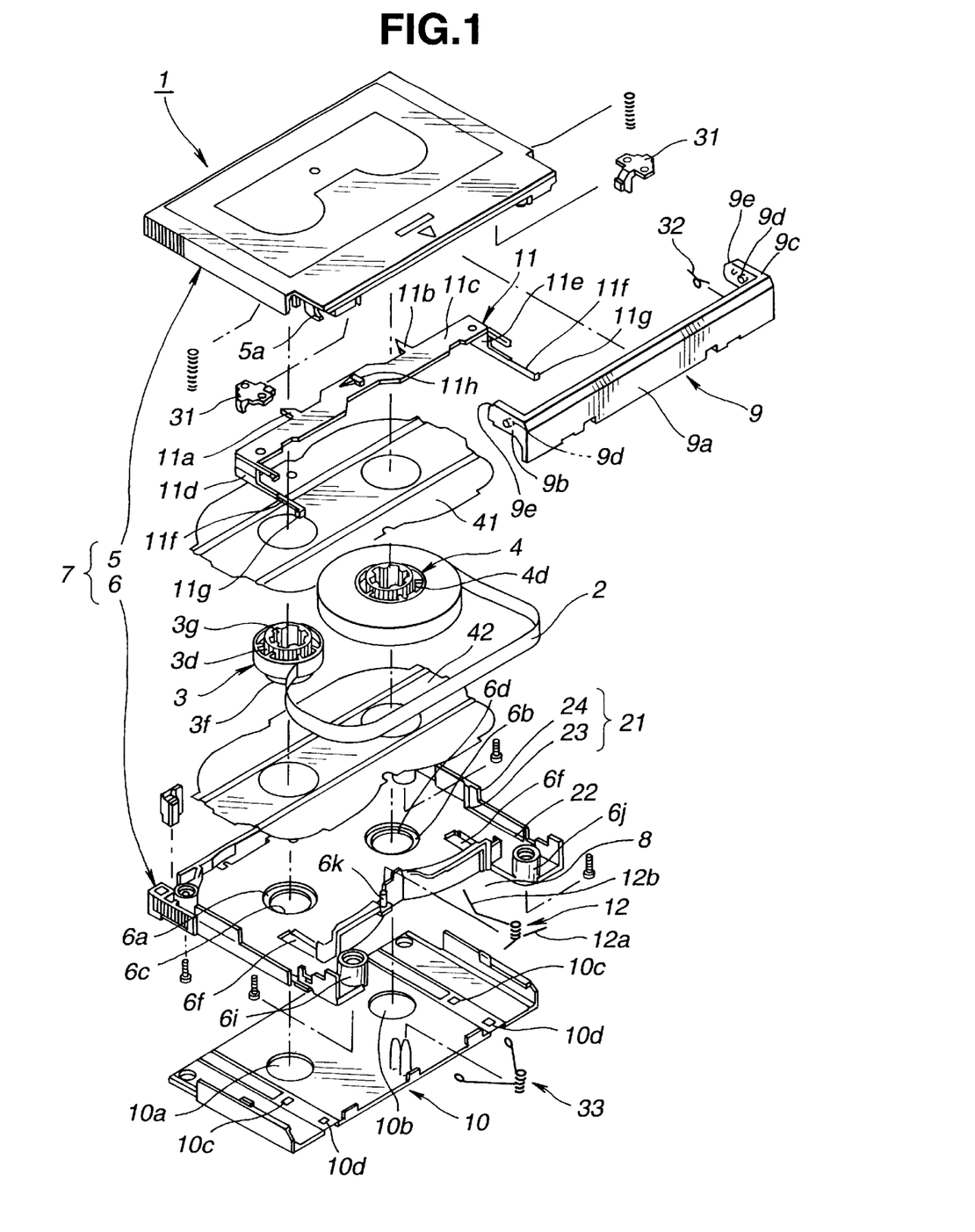
FIG. 1 is an exploded perspective view showing a tape cartridge embodying the present invention.

Referring to FIGS. 1–8, a description will be made with regard to a tape cartridge embodying the present invention. Referring to FIG. 1, a tape cartridge comprises a pair of reels or hubs 3, 4 having a magnetic tape or information recording medium 2 wound thereon, a shell 7 for rotatably housing the reels 3, 4 and including upper and lower halves 5, 6, a lid or rotary flap 9 rotatably mounted to the shell 7 on the front end and for closing a loading opening or a pocket 8 arranged in a front portion of the shell 7, a slide shutter 10 slidably mounted to the bottom of the shell 7 and for closing the bottom of the pocket 108, a reel lock member 11 for ensuring lock of the reels 3, 4 and releasing lock thereof through a pair of reel engagements 11a, 11b in connection with closing and opening operations of the lid 9, a reel lock spring or a first torsion coil spring 12 for biasing the reel lock member 11 in the reel lock direction, and movement restricting means 21 for prevent further movement of the reel lock member 11 when it is urged to move to the reel lock position.

Figure 2:
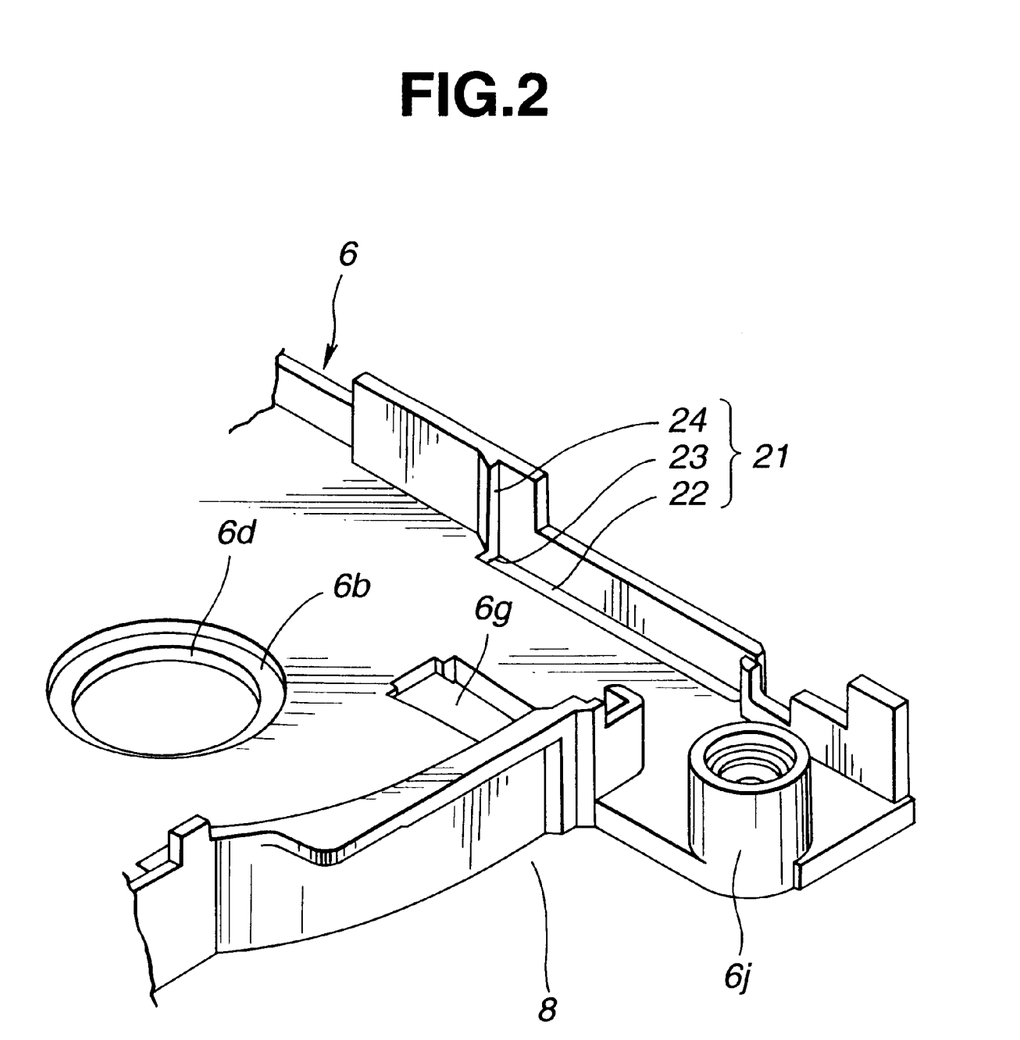
FIG. 2 is an enlarged fragmentary view of FIG. 1.

Referring to FIG. 2, the movement restricting means 21 comprise an end face 23 of a guide groove 22 formed in the inner bottom of the lower half 6 in the reel lock direction and for slidably receiving a lower portion of the reel lock member 11, and a position restricting rib 24 formed with the inner side of the lower half 6 to protrude in the height direction thereof.

Figure 3:
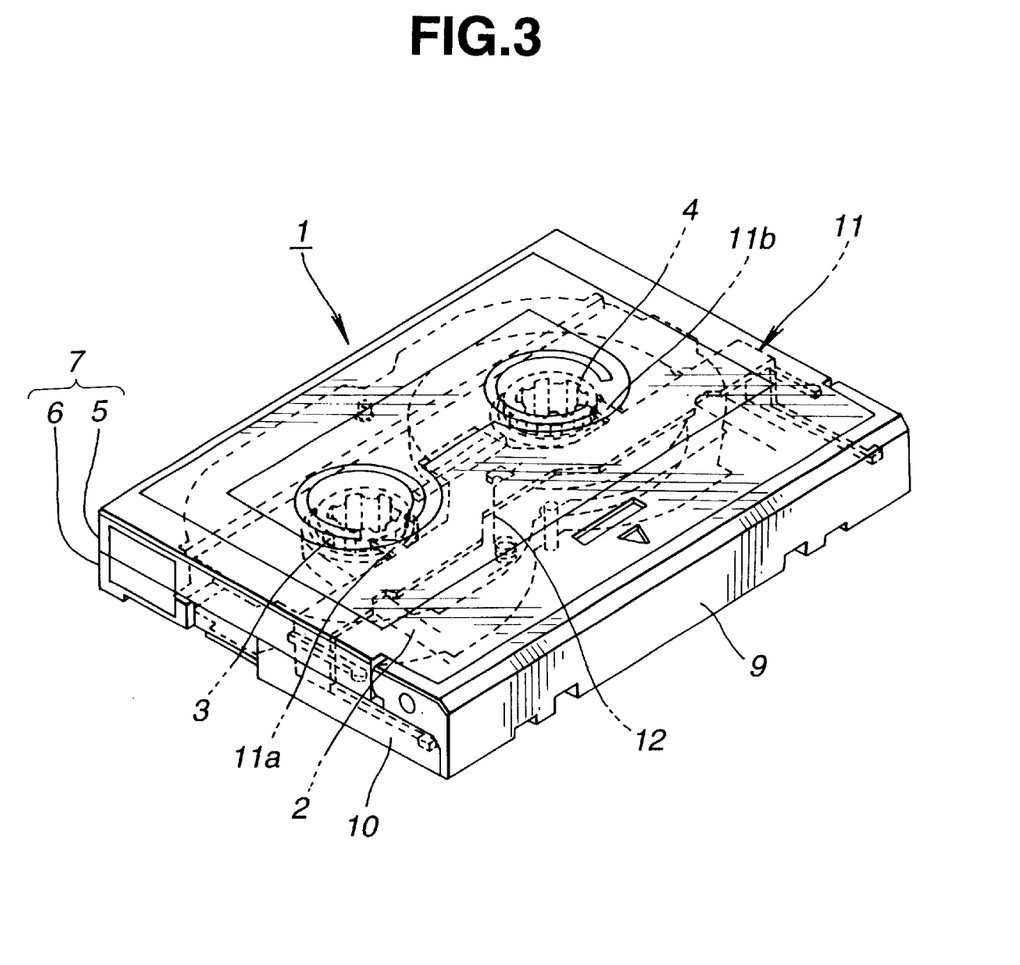
FIG. 3 is a perspective view showing the tape cartridge with a lid closed.
Figure 4:
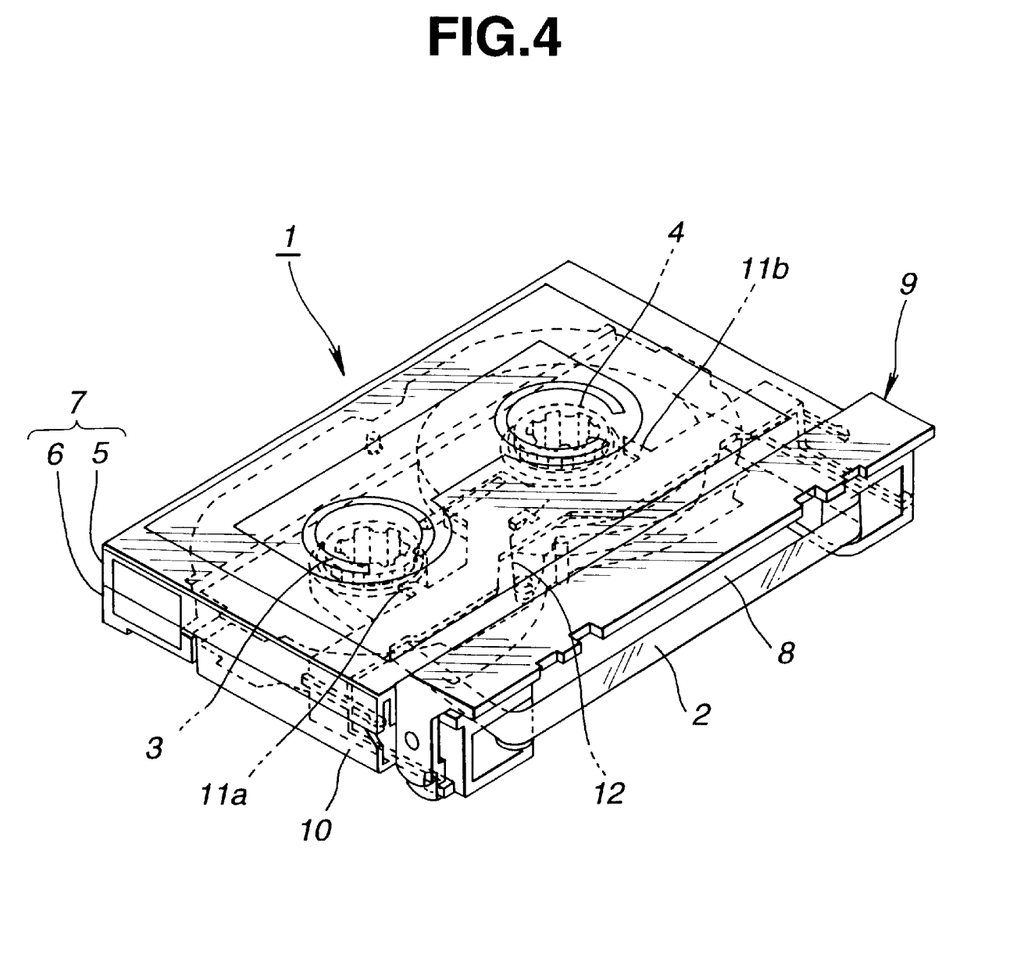
FIG. 4 is a view similar to FIG. 3, showing the tape cartridge with the lid open.

Referring to FIG. 3, when the lid 9 is closed, the reel lock member 11 comes to lock the reels 3, 4 through the reel engagements 11a, 11b. Referring to FIG. 4, when the lid 9 is opened, the reel lock member 11 is urged, in connection with closing and opening operations of the lid 109, to slide against force of the reel lock spring 12, releasing lock of the reels 3, 4 through the reel engagements 11a, 11b.

Figure 5:
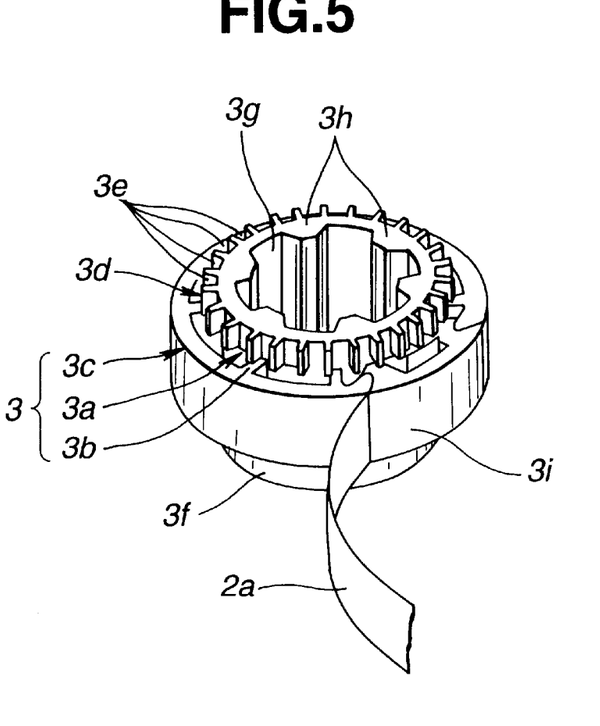
FIG. 5 is an enlarged perspective view showing a reel.

Referring to FIG. 5, the reel 3 comprises an inner cylinder 3a and an outer cylinder 3c conjoined to the outer periphery thereof through ribs 3b. An upper end of the inner cylinder 3a protrudes upward from an upper end of the outer cylinder 3c to obtain a counter-engagement or a claw engagement 3d with which the reel engagement 11a of the reel lock member 11 is engaged. Radially formed in the outer peripheral surface of the counter-engagement 3d are grooves 3e with which the reel engagement 11a of the reel lock member 11 is engaged.

A lower end of the inner cylinder 3a protrudes downward from a lower end of the outer cylinder 3c to obtain a reel seat 3f loosely engaged with a reel receiver or a reel-seat hole 6a of the lower half 6 as described later. The inner peripheral surface of the inner cylinder 3a defines a spindle or reel-drive-shaft hole 3g, and is formed with protrusions 3h for engagement with a spindle or a reel drive shaft of a recording and reproducing apparatus, not shown. A tape damper 3i is detachably mounted to the outer peripheral surface of the outer cylinder 3c so as to fix to the reel 3 a lead tape 2b connected to an end of the magnetic tape 2. The reel 4 is of the same structure as that of the reel 3, having the counter-engagement 4d with which the reel engagement 11b of the reel lock member 11 is engaged.

As shown in FIG. 1, the upper half 5 includes a pair of bearings 5a for rotatably mounting the lid 9 thereto, and a prism 31 for detecting a tape end.

The lower half 6 includes a pair of reel receivers or reel-seat holes 6a, 6b with which reel seats 3f, 4f of the reels 3, 4 are loosely engaged, respectively, a pair of spindle or reel-drive-shaft openings 6c, 6d facing the lower portions of spindle holes 3g, 4g of the reels 3, 4 loosely engaged with the reel receivers 6a, 6b, and a pair of stoppers 6f for locking the slide shutter 10 in the closed state or in the open state.

Figure 6:
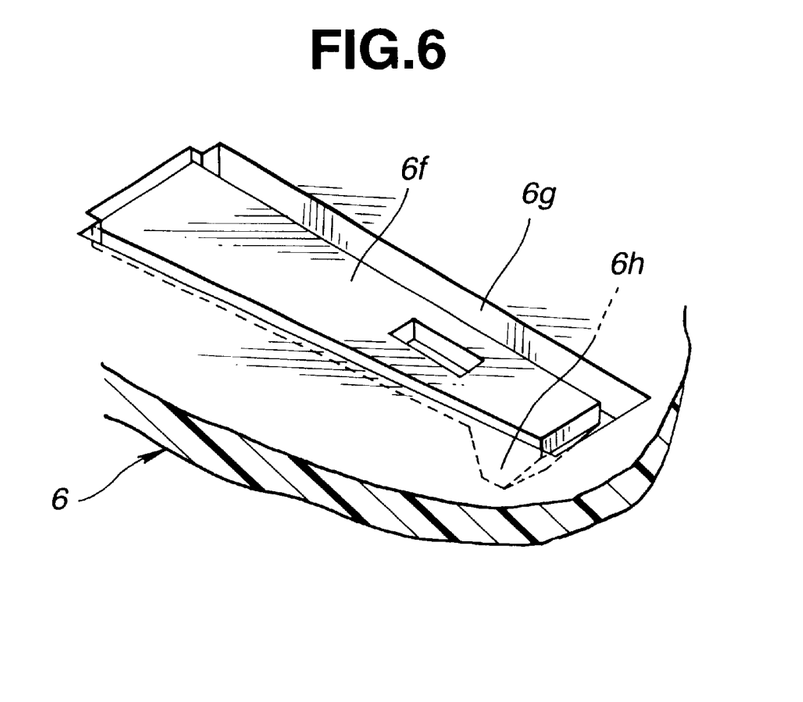
FIG. 6 is a view similar to FIG. 5, showing a stopper.

Referring to FIG. 6, each stopper 6f is obtained by forming a substantially C-shaped recess 6g in the lower half 6. The stopper 6f has a moderate resiliency so that a protrusion 6h arranged at an end thereof is engaged with a first stopper hole 10c or a second stopper hole 10d of the slide shutter 10 as described later. The pocket 8 is arranged in the lower half 6. A pair of tape guides 6j is arranged on both sides of the pocket 8 so that the magnetic tape 2, put therebetween, runs in the pocket 8.

The lid 9 includes a main body 9a and a pair of arms 9b, 9c arranged on both sides thereof, and is rotatably mounted to the upper half 5 by engaging shanks 9d of the arms 9b, 9c with bearings 5a of the upper half 5.

The lid 9 receives torque in the direction of closing the pocket 8 from a lid spring or a second torsion coil spring 32. When rotated against force of the lid spring 32, the lid 9 opens the pocket 8, and urges the reel lock member 11 to slide in the lock release direction with reel-lock-member engagements 9e arranged at ends of the arms 9b, 9c being engaged with lid engagements 11g of the reel lock member 11 as described in detail later.

The slide shutter 10 is formed with a pair of openings 10a, 10b for exposing the spindle openings 6d, 6e of the lower half 6, a pair of first stopper holes 10c with which the stoppers 6f of the lower half 6 are engaged when the pocket 8 is closed, and a pair of second stopper holes 10d with which the stoppers 6f are engaged when the pocket 8 is open.

When the pocket 8 is closed, the slide shutter 10 closes the spindle openings 6c, 6d by the fact that the openings 10a, 10b of the slide shutter 10 fail to positionally correspond to the spindle openings 6c, 6d of the lower half 6. On the other hand, when the pocket 8 is open, the slide shutter 10 opens the openings 6c, 6d by the fact that the openings 10a, 10b positionally correspond to the spindle openings 6c, 6d.

The slide shutter 10 is biased in the direction of closing the bottom of the pocket 8 and the spindle openings 6c, 6d by a shutter spring or a third torsion coil spring 33. When the bottom of the pocket 8 and the spindle openings 6c, 6d are closed, the slide shutter 10 is locked with the stoppers 6f of the lower half 6 being engaged with the first stopper holes 10c of the slide shutter 10.

When loading the tape cartridge 1 into the recording and reproducing apparatus, lock of the slide shutter 10 is released by a shutterlock release member of the recording and reproducing apparatus. The slide shutter 10 is urged to slide against force of the shutter spring 33, opening the bottom of the pocket 8 as well as the spindle openings 6c, 6d with the openings 10a, 10b of the slide shutter 10 corresponding to the spindle openings 6c, 6d of the lower half 6.

The reel lock member 11 includes a main body 11c having a pair of reel engagements 11a, 11b engaged with the counter-engagements 3d, 4d of the reels 3, 4, a pair of legs 11d, 11e arranged on both sides of the main body 11c, and the lid engagementsl 11g formed at one end of the legs 11d, 11e through resilient arms 11f, respectively.

The reel lock member 11 is mounted on the lower half 6 to be slidable within the lengths of the guide grooves 22 with the lower ends of the legs 11d, 11e being inserted into the guide grooves 22 formed in the inner bottom of the lower half 6 along the inner sides, and is biased in the reel lock direction by the reel lock spring 12.

The reel lock spring 12 includes a coil 12a engaged with a shank 6k of the lower half 6 and an arm 12b having one end engaged with a spring engagement 11h arranged in the center of the upper side of the main body 11c of the reel lock member 11 so as to bias the reel lock member 11 in the reel lock direction.

Figure 7:
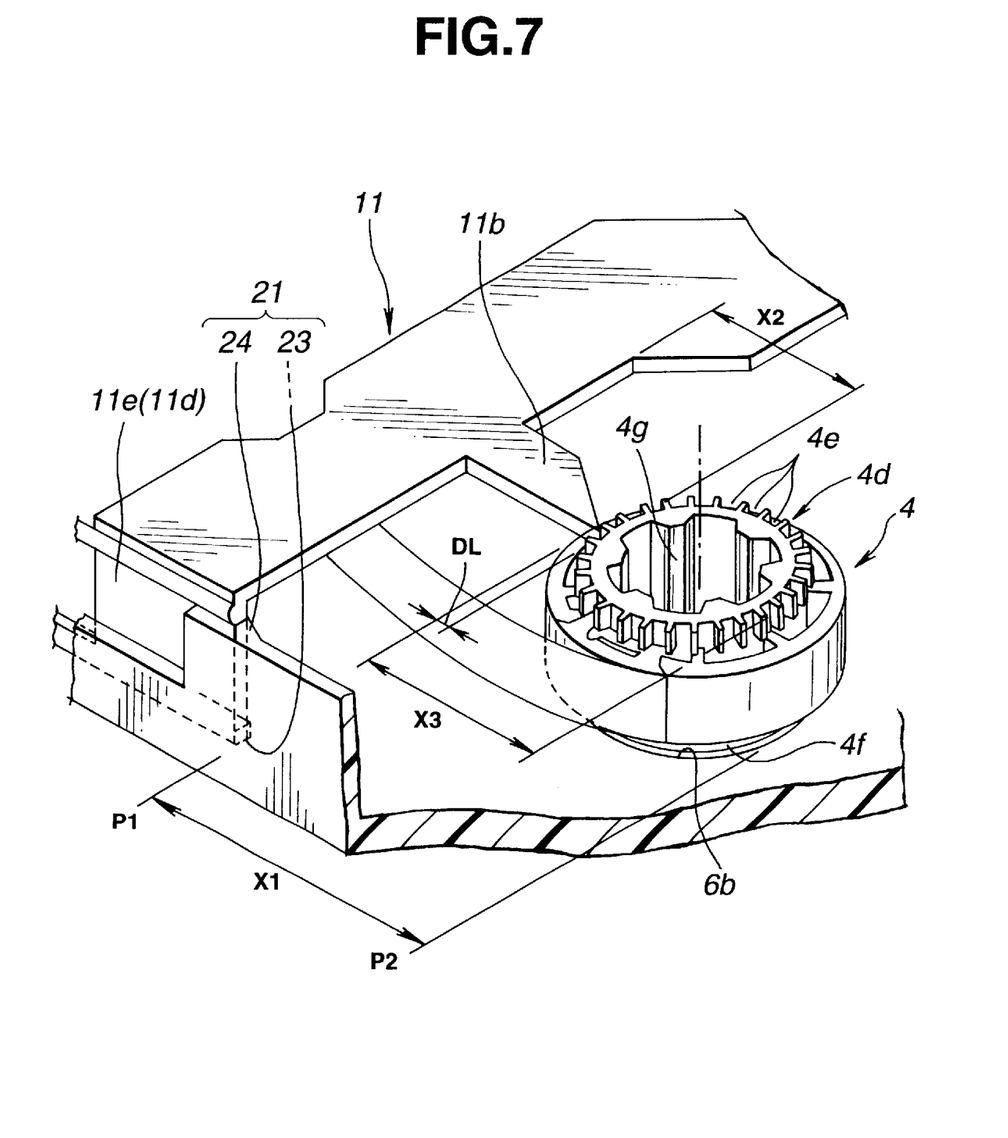
FIG. 7 is a view similar to FIG. 6, showing the reel locked by movement restricting means.

Referring to FIG. 7, when the reel engagements 11a, 11b of the reel lock member 11 are urged to slide to the position where they are engaged with the counter-engagements 3d, 4d of the reels 3, 4, i.e. the reel lock position, the movement restricting means 21 contact the end faces of the legs 11d, 11e of the reel lock member 11 to prevent further movement of the reel lock member 11.

Figure 8:
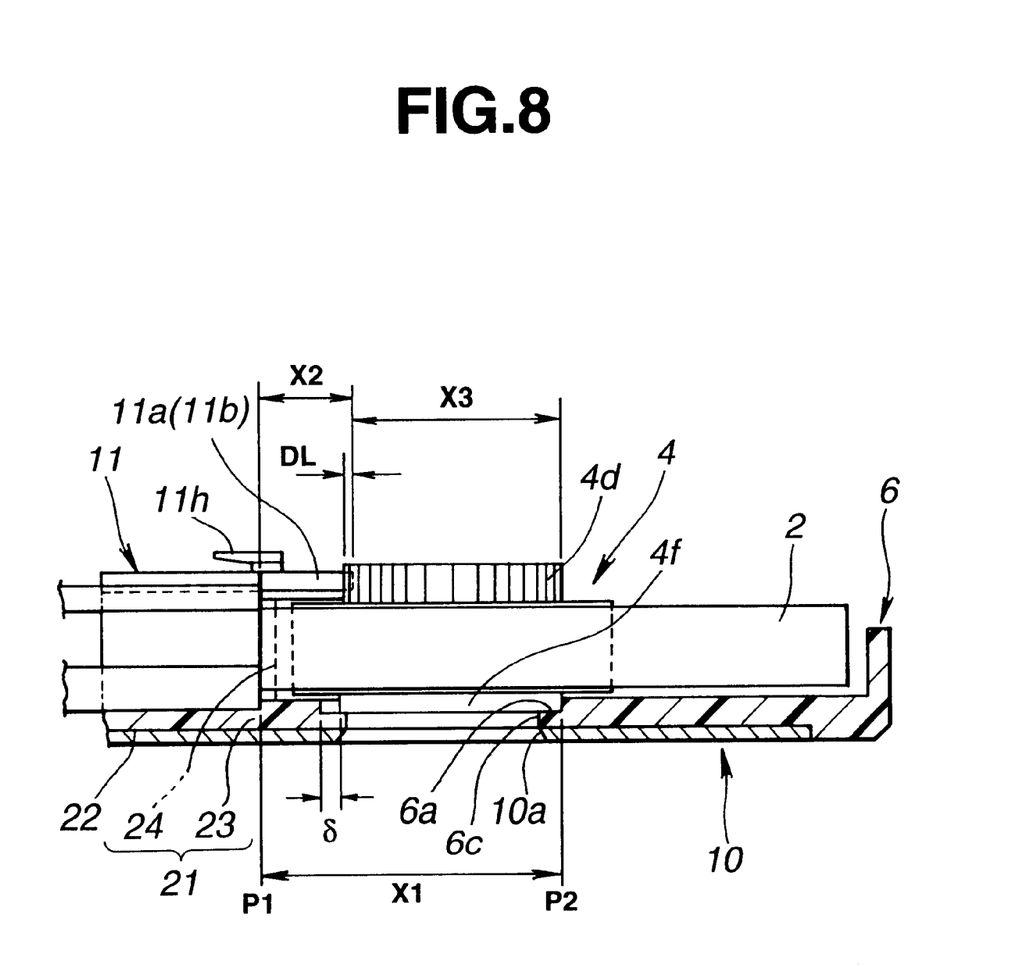
FIG. 8 is a front view showing the reel locked by the movement restricting means.

Referring also to FIG. 8, a distance X1 from a point P1 corresponding to the end face 23 of the guide groove 22 and the position restricting rib 24 that constitute the movement restricting means 21 to a point P2 corresponding to the reel receiver 6a, 6b of the lower half 6 is substantially equal to a value obtained by subtracting an overlap amount DL of the reel engagement 11a, 11b and the counter-engagement 3d, 4d from a value obtained by adding a length X2 of the reel engagement 11a, 11b of the reel lock member 11 to a diameter X3 of the counterengagement 3d, 4d of the reel 3, 4, i.e. X1≈X2+X3−DLmax, and preferably, X1≧X2+X3−DLmax. It is noted that DLmax is a maximum overlap amount corresponding to the depth of the groove 3e, 4e of the counter-engagement 3d, 4d of the reel 3, 4.

Referring to FIG. 8, a play δ is established between the outer peripheral surface of the reel seat 3f, 4f of the reel 3, 4 and the inner peripheral surface of the reel receiver 6a, 6b of the lower half 6. The play 67 is indispensable not only for absorption of a tolerance inevitably produced when manufacturing the recording and reproducing apparatus and the tape cartridges, etc., but for smooth insertion of the spindles of the recording and reproducing apparatus into the spindle holes 3g, 4g.

The play δ is set to a value smaller than the maximum overlap amount DLmax so as not to release engagement of the reel engagements 11a, 11b of the reel lock member 11 with the counter-engagements 3d, 4d of the reel 3, 4 even if the reel seats 3f, 4f of the reels 3, 4 rattle in the reel receivers 6a, 6b of the lower half 6. Considering the above various conditions, the play δ is set preferably to a minimum value aiming at a totalized tolerance including a tolerance on the dimension from the tape-cartridge loading reference position to the spindle of the recording and reproducing apparatus and a tolerance on the center of the reel receiver 6a, 6b. As shown in FIG. 1, upper and lower sheets 41, 42 are arranged on the upper and lower sides of the reels 3, 4 in such a way as to hold them, obtaining stabilized torque of the reels 3, 4 and adjusted winding of the magnetic tape 2.

Next, an operation of the movement restricting means 21 will be described with regard to when X1=X2×X3−DLmax and X1>X2+X3−DLmax.

1) When X1=X2+X3−DLmax

When the legs 11d, 11e of the reel lock member 11 come in contact with the end face 23 of the guide groove 22 and the position restricting rib 24 that constitute the movement restricting means 21, the reel engagements 11a, 11b of the reel lock member 11 are introduced into the grooves 3e, 4e of the counter-engagements 3d, 4d of the reels 3, 4. At the same time, the reel engagements 11a, 11b push the bottoms of the grooves 3e, 4e to press the outer peripheral surfaces of the reel seats 3f, 4f of the reels 3, 4 on the inner peripheral surfaces of the reel receivers 6a, 6b of the lower half 6, obtaining the reels 3, 4 locked. This is not carried out, however, with excessive force that causes the reel lock member 11 and the reels 3, 4 to form an L-shaped protrusion.

2) When X1>X2+X3−DLmax

When the legs 11d, 11e of the reel lock member 11 come in contact with the end face 23 of the guide groove 22 and the position restricting rib 24 that constitute the movement restricting means 21, the reel engagements 11a, 11b of the reel lock member 11 are introduced into the grooves 3e, 4e of the counter-engagements 3d, 4d of the reels 3, 4. Even if the reel engagements 11a, 11b of the reel lock member 11 contact the bottoms of grooves 3e, 4e of the counter-engagements 3d, 4d of the reels 3, 4, the outer peripheral surfaces of the reel seats 3f, 4f of the reels 3, 4 are not pressed on the inner peripheral surfaces of the reel receivers 6a, 6b of the lower half 6, failing to cause the reel lock member 11 and the reels 3, 4 to form an L-shaped protrusion. Then, the reels 3, 4 are locked by the reel lock member 11 only.

The tape cartridge 1 is of the above structure, so that even when X1=X2+X3−DLmax, the reel lock member 11 and the reels 3, 4 fail to form an L-shaped protrusion. Therefore, in assembling the shell 7, the reels 3, 4 and the reel lock member 11 are normally set on the lower half 6, the assemblage fails to be detected as defective by the height checker block 201 or the like.

The upper half 5 is mounted, by screws, etc. to the lower half 6 having the reels 3, 4, the reel lock member 11, etc. set thereon so as to form the shell 7, to which the lid 9 and the slide shutter 10 are assembled, obtaining the tape cartridge 1.

When loading the tape cartridge 1 into the recording and reproducing apparatus, lock of the slide shutter 10 is released by the shutter-lock release member of the recording and reproducing apparatus as described above. The slide shutter 10 is urged to slide against force of the shutter spring 33 so as to open the bottom of the pocket 8 as well as the spindle openings 6c, 6d, and then is locked by the stoppers 6f.

The tape cartridge 1 is moved vertically downward to the spindles of the recording and reproducing apparatus, which causes the lid 9 to rotate in the open direction through a lid opening member of the recording and reproducing member. In connection with rotation of the lid 9, the reel lock member 11 is urged to slide in the reel-lock release direction so as to release lock of the reels 3, 4. And the spindles of the recording and reproducing apparatus are engaged with the spindle holes 3g, 4g of the reels 3, 4.

Having described the present invention with regard to the preferred embodiment, it is noted that the present invention is not limited thereto, and various changes and modifications can be made without departing from the scope of the present invention.

What is claimed is:

1. A cartridge, comprising:

a pair of reels having a tape wound thereon, said pair of reels including respective seats at first ends thereof;

a shell rotatably housing said pair of reels, said shell including upper and lower halves, said lower half being formed with receivers with which said seats of said pair of reels are loosely engaged, respectively, and an opening for accessing said tape;

a lid rotatably mounted to said shell, said lid closing said opening of said shell;

a lock member for locking said pair of reels in connection with a closing operation of said lid;

a spring biasing said lock member in a reel lock direction; and means for restricting movement of said lock member when said lock member is urged to move to a reel lock position, wherein said means for restricting movement comprises an end face of a guide groove formed in an inner bottom surface of said lower half arranged in said reel lock direction for slidably receiving a lower portion of said lock member, and a rib formed with an inner side wall of said lower half.

2. The cartridge as claimed in claim 1, wherein when said lock member locks said pair of reels, said means for restricting movement holds said lock member in a position where outer peripheral surfaces of said seats of said pair of reels contact inner peripheral surfaces of said receivers of said shell.

3. The cartridge as claimed in claim 1, wherein when said lock member locks said pair of reels, said means for restricting movement holds said lock member in a position where said outer peripheral surfaces of said seats of said pair of reels fail to contact said inner peripheral surfaces of said receivers of said shell.

4. A cartridge, comprising:

a pair of reels having a tape wound thereon, said pair of reels including respective seats at lower ends thereof;

a shell rotatably housing said pair of reels, said shell including upper and lower halves, said lower half being formed with receivers with which said seats of said pair of reels are loosely engaged, respectively, and an opening for accessing said tape;

a lid rotatably mounted to said shell, said lid closing said opening of said shell;

a lock member for locking said pair of reels in connection with a closing operation of said lid; a spring biasing said lock member in a reel lock direction; and a device arranged on said lower half, said device restricting movement of said lock member when said lock member is urged to move to a reel lock position, wherein said device comprises an end face of a guide groove formed in an inner bottom surface of said lower half arranged in said reel lock direction for slidably receiving a lower portion of said lock member, and a rib formed with an inner side wall of said lower half.

* * * * *